G. S. NEELEY.
ELECTRIC REGULATOR.
APPLICATION FILED SEPT. 9, 1910.
1,157,955.
Patented Oct. 26, 1915.
2 SHEETS—SHEET 1.
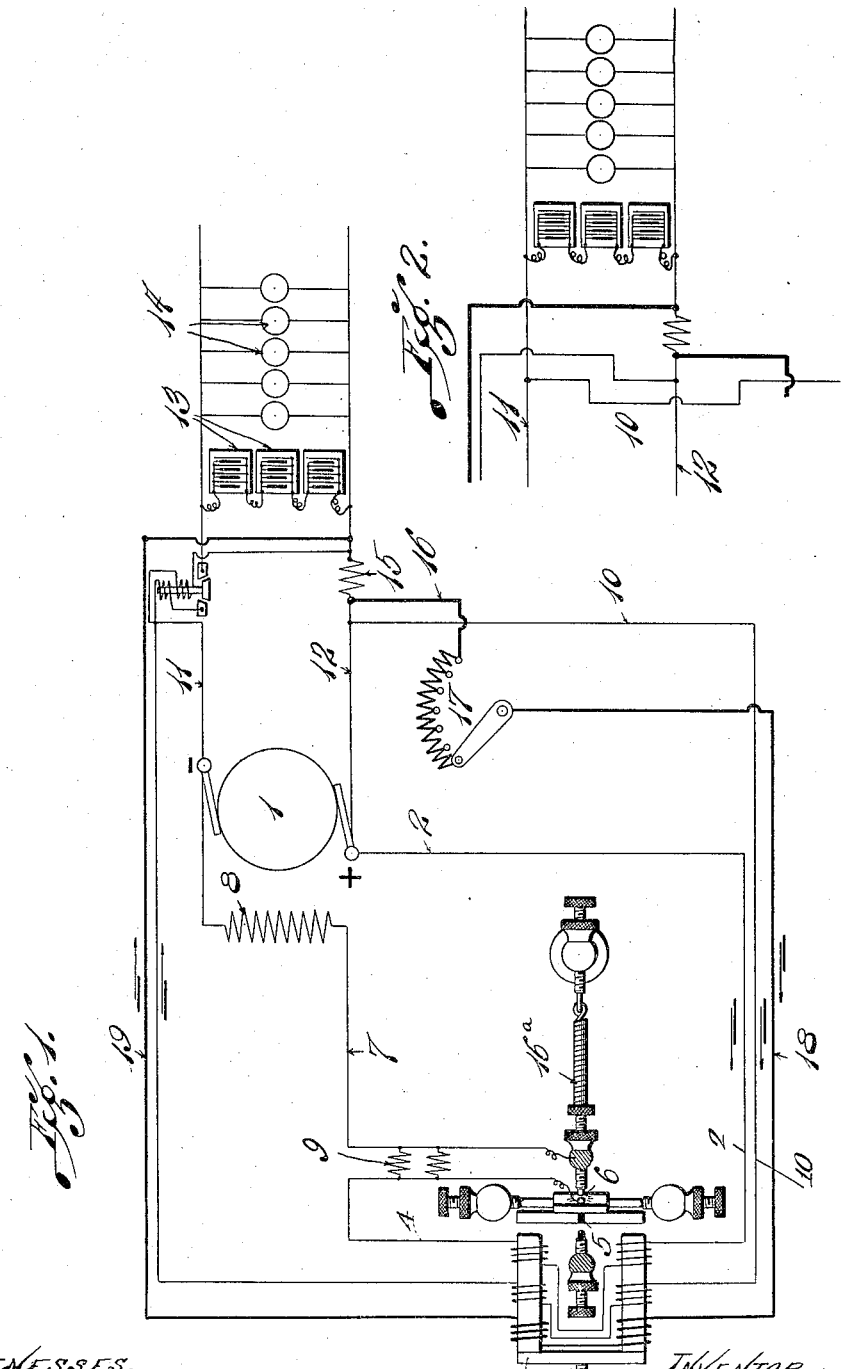

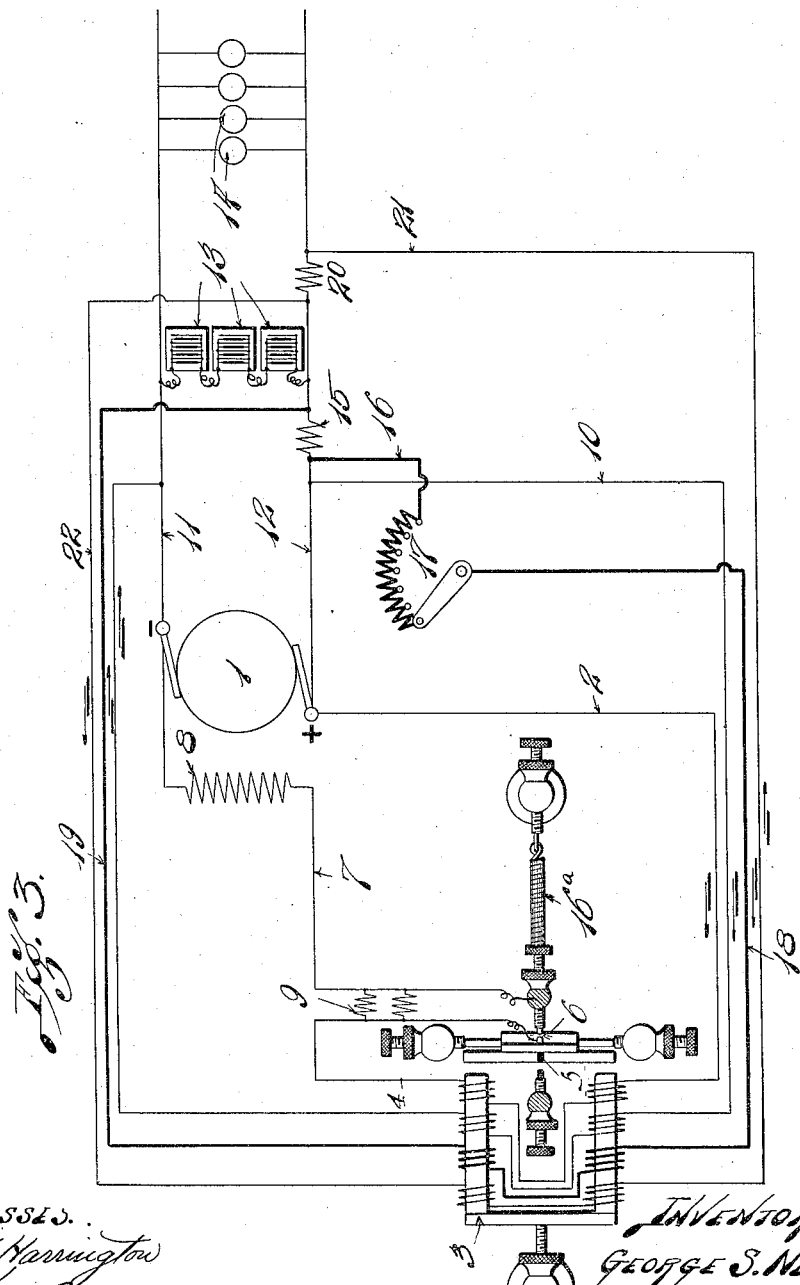

UNITED STATES PATENT OFFICE.

GEORGE SPENCER NEELEY, OF ST. LOUIS, MISSOURI, ASSIGNOR, BY MESNE ASSIGNMENTS, TO GENERAL ELECTRIC COMPANY, A CORPORATION OF NEW YORK.

ELECTRIC REGULATOR.

1,157,955.  Specification of Letters Patent.  Patented Oct. 26, 1915.

Application filed September 9, 1910. Serial No. 581,295.

*To all whom it may concern:*

Be it known that I, GEORGE SPENCER NEELEY, a citizen of the United States, residing at St. Louis, Missouri, have invented a certain new and useful Improvement in Electric Regulators, of which the following is a full, clear, and exact description, such as will enable others skilled in the art to which it appertains to make and use the same, reference being had to the accompanying drawings, forming part of this specification, in which—

Figure 1 is a diagrammatic view illustrating my improved system adapted to be used for general lighting or power purposes, as well as for the charging of storage batteries, or both. Fig. 2 is a modification of the system shown in Fig. 1, in which the connections of one of the controlling circuits are reversed. Fig. 3 is a modification showing an additional controlling circuit for a voltage regulator.

This invention relates to a new and useful improvement in automatic regulators for direct current dynamos, and is adapted for use whether the dynamos supply electricity for light or power, or for the purpose of charging storage batteries.

My invention relates especially to a means for charging of storage battery systems in connection with railway car lighting devices where the generator is driven from a variable source of speed, such as the car axle will afford.

My present invention is an improvement over my automatic regulator described in Patent No. 838,802, dated December 18, 1906, to which patent reference is made for any details of construction not specifically set forth in this specification. In that patent I have disclosed an automatic regulator for the purpose of increasing the E. M. F. of the charging dynamo to correspond with the counter E. M. F. of the batteries to be charged. In order to do this it was necessary to provide two electro-magnets having each two windings, one winding on one magnet energized by the voltage or E. M. F. of the charging dynamo, and the other winding energized by the field current of the dynamo, while the second magnet is controlled by two windings, one energized by the current output of the generator, and the second being connected in shunt with the storage batteries. In my present device I do away with one of the electro-magnets used in my old construction and accomplish the same result with the use of a much more simple and efficient apparatus.

In Fig. 3 of the patent a modification of my old system is found for regulating the current output in a lighting system by the use of a single electro-magnet, which is under the influence of three windings, one in series with the field of the dynamo, a second connected across the brushes of the generator, and a third arranged with a current opposing that flowing in the first two windings. The energizing of which third winding is derived from the main working current output to the system. It should be particularly noted that the tendency of the dynamo under the influence of this latter type of regulating device is to generate a still higher E. M. F. with each increase of current output to the system, or in other words the action of this third winding produces the same effect on the E. M. F. of the system as does the series or "compound" windings on the compound wound direct current dynamo.

In the operation of train lighting systems which embody an axle-driven dynamo, which supplies current to a set of storage batteries, as well as a series of lamps, I have found that the reserve or non-compounding action is the most desirable for the reason that as the storage battery is employed to supply energy to the translating devices or lamps during the intervals that the car is not in motion, or is below the proper speed to produce a slightly higher E. M. F. than the batteries, there are times when the batteries become nearly exhausted of all stored energy owing to the conditions of railroad service, and combinations of circumstances, as where a train is compelled to remain inactive for a period sufficient to exhaust the battery. When the batteries have run down or become depleted from a condition like this, it is extremely undesirable to "put them on charge", without some means of automatically limiting the flow of current into the batteries, as it is a well known fact that the tendency of the batteries is to absorb an abnormal current flow at the beginning of the charge.

In using my former regulator the greater the ampere flow of current to the batteries the greater the action of this current is to keep on increasing the E. M. F. of the generator, and consequently this action aggravates conditions by increasing the current flow into the exhausted batteries at the very instant that a check is needed upon the flow. There have been instances in actual practice where this condition was so aggravated that the field coils and armature windings of the generator have been burnt out due solely to the tendency of this form of regulator to short circuit the field resistance and to keep it in such condition as long as the generated E. M. F. was below the normal pre-determined value. In my present system I propose to reverse this action and thereby give to the batteries what is known in the art as a "taper charge", i. e., when the energy of the batteries is nearly exhausted, and they are put "on charge" the current flowing into the batteries will have an automatic reaction on the E. M. F. of the charging dynamo to decrease its voltage as the ampere flow of current into the batteries is increased, and again to increase the voltage or E. M. F. of the generator when the ampere current "tapers down" as the batteries near their full charge. For example, in a 32 volt system a thoroughly depleted battery will absorb a current flow of, say 40 amperes at 32 volts E. M. F. when the charging process first begins. As the charging proceeds the ampere flow gradually "tapers downward" while the E. M. F. must "taper upward" if the batteries are expected to be fully charged.

It will readily suggest itself to those skilled in the art that my regulator is adaptable to any range of voltage and currents to suit the conditions under which it is desirable to operate.

Referring to Fig. 1, 1 indicates the charging dynamo or generator, 2 is a wire connected with the positive brush of the dynamo and coiled around the two legs of the electro-magnet 3 continuing at 4 to be attached to the movable contact 5 of the regulator, which bears against a fixed contact point 6 under the influence of a spring 16$^a$. This circuit is continued by a wire connection 7 from the fixed contact 6 through the field coil 8 of the dynamo, back to the negative brush. The two wire connections 4 and 7 are interconnected through a fixed resistance 9.

A second controlling circuit is formed by wires 10 connected across the mains 11 and 12, extending from the brushes of the generator or dynamo, said circuit including coils also wound around the two cores of the electro-magnet 3 to aid the coils in the circuit 2, 4 and 7.

Across the mains 11 and 12 are connected the storage batteries 13 in series, and the translating devices or lamps 14 in parallel. A fixed resistance 15 is placed in circuit with the main 12. A third controlling circuit is formed by wires 16 connected on one side of the resistance 15 to a rheostat 17, and through wire 18 coiled around the two cores of the magnet 3 and by wire 19 to the opposite side of the resistance 15 on the main 12. The coils included in this third circuit aid those in the two preceding circuits.

The regulator with its movable contact member controlled by the electromagnet and spring 16$^a$ is a device whose operation is well known, and need not be further described except to state that it controls the voltage of the generator by varying the effect of the resistance in the field circuit.

The difference between my improved system as illustrated in Fig. 1, and that shown in Fig. 3 of my patent consists in reversing the effect of the coil in the current output controlling circuit 16, 18 and 19 so that all three controlling circuits coiled around the electro-magnet 3 produce a flux in the same direction rather than as in my patent heretofore mentioned, where the flux of the line current circuit opposes that in the other two. The result is that with my regulator as shown in this figure, and the batteries 13 exhausted or "run down", they will in this condition absorb a current flow of, say 40 amperes at a voltage of 32. The action of so large a current flow is to cause a corresponding energizing of the magnet 3, which proportionately causes the resistance 9 to be more effective in the field circuit during this interval of heavy current flow, and thereby automatically retains the voltage of the generator 1 at the minimum (32 volts) while the batteries are taking their maximum current. This effect is brought about by the increased time of separation of the contact points 5 and 6 of the regulator. As the batteries 13 approach their "full charge" their counter E. M. F. rises, which has a natural tendency to reduce the current flow that they will absorb, to say 20 amperes. It will be noted, therefore, that while the ampere flow of current has "tapered down" from 40 amperes to 20 amperes, this has caused a corresponding diminution of the energy of the magnet 3, decreasing its attraction on the vibrating arm carrying movable contact 5, and this latter member under the control of the spring 16 is brought into more sustained contact with the fixed contact 6. This renders less effective the resistance 9, operating thereby to increase the field current.

In Fig. 2, I have illustrated a slight modification of the system shown in Fig. 1, and have reversed the connections of the circuit 10 to the mains 11, 12. With this arrangement, the action of the coil responsive to the voltage of the dynamo 1 is reversed and opposes the action of the coil responsive to the current output and that carrying the field current. These latter coils, however, act accumulatively, as in Figs. 1 and 3.

The regulation with this arrangement is carried out in the same manner, and only the sensitiveness of the regulating action is affected.

When it is desired to maintain a practically constant voltage on that part of the system which supplies the lighting load while the rate of current flow and voltage may be varied to suit the conditions of that part of the system to which the batteries are connected I prefer to use the construction of parts shown in Fig. 3. In this figure there are four circuits controlling the electromagnet 3, being wound thereupon. Three of these circuits are the same as disclosed in Fig. 1, i. e. a circuit in series with the field of the charging dynamo, a second circuit connected across the brush terminals of the dynamo, and a third circuit connected in shunt relation to a resistance in one of the mains so that it is energized by the current output. In this latter construction I introduce a fourth circuit similar to the last named circuit, but connected to the main 12 on either side of a fixed resistance 20, in series with the main 12 between the connections to the batteries 13, and to the translating devices or lamps 14. This circuit comprises a wire 21 connected to the main 12 on one side of the resistance 20 being coiled around the core pieces of the electromagnet 3 and continuing through the wire 22 to a point on the opposite side of the resistance 20 connected to the main 12. In explaining the action of this fourth winding in the system, suppose that the generator 1 is supplying a current to the batteries 13, of 40 amperes at 32 volts E. M. F. If now the lamp load 14 is added it will correspondingly increase the demand for current upon the generator 1 above 40 amperes. This action would, of course, produce a proportionate drop in the E. M. F. below 32 volts. The fourth winding 21 and 22 is desired to prevent this diminution of voltage on the system due to the adding or subtracting of the lamp load 14 while the batteries are below their normal charge.

When the lamp load 14 is added to the system a proportional current is shunted around the resistance 20, thereby producing a flux in the magnet 3 opposing that set up by the currents that are flowing in the other three controlling circuits wound on the magnet 3. This action proportionally diminishes the action of the magnet 3 which allows the spring 16 to cause the vibrating arm carrying the movable contact 5 to vibrate in closer proximity to the fixed contact 6, and thereby reduces the action of the resistance 9 in the field circuit of the generator, which causes the field current to increase without affecting the magnet 3. This additional field current causes the generator to develop an additional ampere current which supplies the added lamp load without appreciably affecting the voltage of the general system. When the lamp load 14 is withdrawn the demagnetizing effect of the current in the circuit 21 and 22 is at the same instant withdrawn. The remaining three circuits coiled on the electro-magnet 3 therefore becomes more effective, which results in its causing the movable contact 5 to vibrate away from the fixed contact 6 to an increased extent increasing the resistance between these points, and thereby making more effective the resistance 9 in the field circuit.

It is obvious to those skilled in the art that the entire current taken by the batteries or the lamp load might be passed around a coil on the magnet 3, but it is preferred to use constant resistances 15 and 20 in order that small wires may be used in the circuits which are wound around the electro-magnet 3.

When the final limit of low train speed is reached at which the generator will maintain sufficient E. M. F. to counteract a reverse or discharging flow of current from the batteries it will be automatically cut out of circuit during such intervals, and reconnected again when the generator E. M. F. has reached a proper value by means of any well known automatic low voltage cut-out as shown in Fig. 1.

Particular attention is called to the effect obtained in the ultimate regulation of the generated E. M. F. by the resistance 20 with an additional shunt coil which always works in an opposite direction to the resistance 15 and its shunt coil. The novelty of the new arrangement consists in so connecting the batteries to the system, that any current absorbed by them has a lowering or depressing effect on the ultimate E. M. F. produced by the generator 1 across the mains 11 and 12. This is done by connecting the batteries to the mains 11 and 12 between two relatively constant resistances of equal shunting proportions or resistances, i. e., the voltage drop across the resistances 15 and 20 are the same on equal loads. Attention is called to the fact that these two resistances 15 and 20 are so arranged that they have opposite effects on the ultimate magnetization of the magnet 3, because they shunt currents in opposite directions through the circuits 16, 18 and 19, and again 21 and 22. It will also be noticed that, owing to the arrangements of these connections, none of the current that is absorbed by the batteries 13, passes through the resistance 20, while the total current out-put must pass through the resistance 15. The resistance 15 has a decreasing effect on the generated E. M. F. in proportion to the current flowing through it under predetermined limits, which in this case for illustrative purposes, is 10 volts, or a maximum of 42 and a minimum of 32 volts. The effect of the resistance 20 is solely to counteract the effect on the regulator magnet 3, of the current passing through the other resistance 15, on its way to the lamps or translating devices 14. With these points understood I will now briefly explain the action of the resistances 15 and 20.

The initial adjustment of the regulated E. M. F. across the mains 11 and 12, is determined at a maximum of 42 bolts by adjustment of the spring 16ª. The automatic features of my new device are now such that if the batteries 13 be thrown on the system at a charging rate of say, 20 amperes, the immediate effect is such that the resistance 15 will shunt a current proportional to the 20 amperes charging current, which is so designed in this instance, to instantly cause the regulated E. M. F. across the mains 11 and 12 to drop down proportionately to 37 volts, instead of 42 as at the original adjustment.

The proportions are such that had the maximum charging rate been 40 amperes, instead of 20, the effect on the regulated E. M. F. would have been to lower it to the minimum of 32 volts.

With the battery charging current rate at 20 amperes and the regulated E. M. F. at 37 volts, and there is added 20 amperes more load, by means of the lamps 14, the effect of this 20 amperes is such that the first effect in passing the resistance 15, on the regulator magnet 3, is entirely nullified in its passage through the second resistance 20. Hence in practice it is found that the original 37 volts is not in the least disturbed by the added 20 amperes lamp load, owing to the equal and opposing effects of the derived currents flowing in their respective coils on the magnet 3, and forming shunt circuits around the resistances 15 and 20. Thus it will be noticed that any current passing the resistance 20, serves to counteract an equal effect of the same current flow in the resistance 15.

The paramount object of my new device is to produce a simple regulator, whereby the internal condition of the batteries, on which their charging rate entirely depends at any given E. M. F., will have absolute and a proportional control over the generated E. M. F., while any added load such as, lamps or transplanting devices shal lnot affect the generated E. M. F. beyond the point automatically set by the charging rate of the batteries. These points of advantage are all accomplished over my former Patent No. 838,802, by the new and novel arrangement of the resistances 15 and 20 and the change in the direction of current flow of that part of the current output which is supplied to the batteries as a charging current. This new arrangement, of course, calls for a fourth winding upon my new device.

I do not wish to limit this invention to the specific mechanism disclosed and wired as illustrated. The scope of my invention is indicated in the accompanying claims.

I claim:

1. A system of electrical distribution, comprising a dynamo, storage batteries and current consuming devices connected across the mains of the dynamo, an electro-magnet having a plurality of windings, one being energized by the field current of the generator, a second by the voltage of the generator, a third energized in proportion to the total current output said winding acting accumulatively with the first two windings, and a means for varying the resistance in the field circuit of the generator and controlled by said electro-magnet.

2. A system of electrical distribution comprising a generator and mains extending therefrom, storage batteries and translating devices connected in multiple with the said mains, and an automatic regulator for regulating the field density of the generator, said regulator including an electromagnet having four independent windings, one of said windings being in circuit with the field winding of the generator, the second winding being connected in circuit across the brushes of the said generator, the third winding being adapted to receive a current in proportion to the total current furnished to the said storage batteries and translating devices, said three windings being arranged to act accumulatively, the fourth winding on said magnet being adapted to receive a current proportional to that furnished to the translating devices, said fourth winding being arranged to act oppositely with respect to the currents in the first three mentioned windings.

3. A system of electrical distribution comprising a dynamo, storage batteries and translating devices connected across the mains of the dynamo, an electro-magnet, a plurality of windings upon said magnet, one winding being energized by the field current of the dynamo, a second by the voltage of the dynamo, a third by a current proportional to the generator output, and a fourth by a current proportional to that supplied to the translating devices, said latter current flowing in a reverse direction to that in the first three windings, and a resistance adapted to be thrown in series with the field winding of the dynamo by said magnet.

4. A system of electrical distribution comprising a dynamo, storage batteries and translating devices connected across the mains of the dynamo, an electromagnet, a plurality of windings upon said magnet, one winding being energized by the field current of the dynamo, a second by the voltage of the dynamo, a third by a current proportional to the generator output, said first and third windings acting accumulatively, and a resistance adapted to be thrown in series with the field winding of the dynamo by said magnet.

5. A system of electrical distribution comprising a dynamo, storage batteries and translating devices connected across the mains thereof, an electro-magnet, a plurality of windings on said magnet, one being energized by the field current of the dynamo, a second by the voltage of the dynamo, a resistance in series between the dynamo and the current consuming devices, and a third winding in series around the resistance, the currents in the said windings on the magnet being in the same direction to have accumulative effect, and a resistance adapted to be placed in series with the field winding of the dynamo by the electro-magnet.

In testimony whereof I hereunto affix my signature in the presence of two witnesses, this sixth day of September, 1910.

GEORGE SPENCER NEELEY.

Witnesses:
F. R. CORNWALL,
B. L. CROWLEY.

Copies of this patent may be obtained for five cents each, by addressing the "Commissioner of Patents, Washington, D. C."